(12) United States Patent
Liang

(10) Patent No.: US 7,197,068 B2
(45) Date of Patent: *Mar. 27, 2007

(54) NON-ITERATIVE TIME-DOMAIN EQUALIZER

(75) Inventor: Haixiang Liang, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/265,322

(22) Filed: Nov. 1, 2005

(65) Prior Publication Data

US 2006/0062290 A1    Mar. 23, 2006

Related U.S. Application Data

(63) Continuation of application No. 09/929,329, filed on Aug. 13, 2001, now Pat. No. 6,961,372.

(51) Int. Cl.
*H04B 1/38* (2006.01)
*H04L 25/08* (2006.01)

(52) U.S. Cl. .................. 375/232; 375/260; 375/348

(58) Field of Classification Search ............. 375/229, 375/230, 231, 260, 348
See application file for complete search history.

(56) References Cited

U.S. PATENT DOCUMENTS 6,185,251 B1 * 2/2001 Fertner ................. 375/231
6,404,806 B1   6/2002 Ginesi et al.
6,834,079 B1   12/2004 Strait et al.

OTHER PUBLICATIONS

Lee et al., Performance Evaluation of a Fast Computation Algorithm for the DMT In High-Speed Subscriber Loop, Dec. 1995, IEEE Journal on Selected Areas in Communication, vol. 13, No. 9, pp. 1564-1570.

* cited by examiner

*Primary Examiner*—Jay K. Patel
*Assistant Examiner*—David B. Lugo
(74) *Attorney, Agent, or Firm*—McAndrews, Held & Malloy, Ltd.

(57) ABSTRACT

A method for forming a non-iterative time-domain equalizer (TEQ) and apparatus corresponding thereto. A channel response H(z) is followed by a TEQ response A(z) and a residual output B(z) is chosen so that its degree is less than a cyclic prefix. An error signal is formed so that E(z)=H(z)A(z)−B(z). With a unit input, the error signal is set to zero and B(z)=H(z)A(z). Each signal is expressed as a polynomial, having varying degrees, and a having corresponding coefficients. Once expanded, the coefficients of similar degree can be equated on both sides of the equation. The error signal can then be determined in terms of coefficients corresponding to the TEQ and the residual signal. The coefficients of the channel response can be derived from the channel training estimates. The error signal is minimized and the result is solved for in terms of the desired TEQ coefficients.

18 Claims, 6 Drawing Sheets

General flow of steps

NON-ITERATIVE TIME-DOMAIN EQUALIZER

CROSS-REFERENCE TO RELATED APPLICATIONS

The present application is a continuation of U.S. patent application Ser. No. 09/929,329, filed Aug. 13, 2001, now U.S. Pat. No. 6,961,372.

FIELD OF THE INVENTION

A non-iterative method of designing a time-domain equalizer (TEQ) for a DSL (Digital Subscriber Line) modem that employs discrete multitone (DMT) modulation, the TEQ having an output with a duration less than the cyclic prefix as specified in the DMT standard.

BACKGROUND OF THE INVENTION

DSL is a technology for bringing high-bandwidth information to homes and small businesses over ordinary copper telephone lines. xDSL refers to different variations of DSL, such as ADSL, HDSL, and RADSL. If a home or small business is close enough to a telephone company central office that offers DSL service, data might be received at rates up to 6.1 megabits (millions of bits) per second (of a theoretical 8.448 megabits per second), enabling continuous transmission of motion video, audio and even 3-D effects. More typically, individual connections will provide from 1.544 Mbps to 512 Kbps downstream and approximately 128 Kbps upstream. A DSL line can carry both data and voice signals, with the data part of the line being continuously connected.

Traditional phone service (sometimes called POTS for "plain old telephone service") connects a home or small business to a telephone company office over copper wires that are wound around each other, and typically called a twisted pair. An input device (such as a phone set) takes an acoustic signal (which is a natural analog signal) and converts it into an electrical equivalent in terms of volume (signal amplitude) and pitch (frequency of wave change). The signaling of the telephone company is already configured for analog wave transmissions, so this approach has been very effective in transferring information back and forth between a signaling device and the telephone company. A computer, however, must have a modem to demodulate the analog signal and convert signaling values into the typical string of "0" and "1" values which serve as digital information.

Such analog transmissions use only a small portion of the available amount of information that could be transmitted over copper wires, and hence the maximum amount of data that can be received using ordinary modems is about 56 Kbps (thousands of bits per second). Later technologies, including Integrated Services Digital Network (ISDN), can receive data at speeds up to 128 Kbps. In general, the ability of a computer to receive information is constrained by several factors, including the following: the telephone company applies filtering to information that arrives as digital data; the information is transformed into analog form for transmission over the telephone line; and the transmission requires a modem to change the analog signal information back into digital information.

DSL uses a much wider bandwidth for transmitting data. Additionally, the digital signal can be separated from the voice signal and shifted upwards on the transmission band. The overall bandwidth can be simultaneously used to transmit an analog (voice) signal and digital data signal over the same data line. Asymmetric Digital Subscriber Line (ADSL) is asymmetric in that it uses most of the channel to transmit downstream to the user, and only a small part to receive information from the user. ADSL is generally offered at downstream data rates from 512 Kbps to about 6 Mbps. ADSL was specifically designed to exploit the one-way nature of most multimedia communication in which large amounts of information flow toward the user, and only a small amount of interactive control information is returned.

To connect to a DSL source (i.e., DSL, ADSL, or otherwise), a DSL modem is needed. Various modulation schemes can be used in such modems. Discrete multitone (DMT) modulation is a common method of separating a DSL signal so that the usable frequency range is separated into 256 frequency bands (or channels) of 4.3125 KHz each. DMT generally uses the fast Fourier transform (FFT) algorithm for modulation and demodulation. Examples of devices which employ the DMT method of modulation include ADSL modems that conform to ITU-T Recommendations G.992.1 and G.992.2. The ITU-T (which is the Telecommunication Standardization Sector of the International Telecommunications Union) is the primary international body for fostering cooperative standards for telecommunications equipment and systems. Other modulation technologies for DSL include carrierless amplitude modulation (CAP) and multiple virtual line (MVL).

DMT modems transmit information coded in symbols consisting of blocks of length N of time-domain samples (typical values of N are 256 and 512). The fundamental algorithms used to process these symbols are based on the Discrete Fourier Transform (DFT). A fundamental assumption underlying use of the DFT is that the signals being processed are periodic and of finite duration. DMT symbols satisfy neither of these conditions. Further, transmitting DMT symbols through an analog channel convolves the symbols with the unit-sample response of the channel. Referring now to FIG. 1A, a representative unit response h(n) (100) is shown, with N being the time index. This unit-sample response has a duration that is an appreciable fraction of N (102). As result, the samples that are transmitted as part of one symbol appear combined with samples of the succeeding symbol. This phenomenon is called Intersymbol Interference (ISI).

DMT modems typically use two techniques to mitigate the effect of ISI: a cyclic prefix, and a time-domain equalizer (TEQ). The cyclic prefix concept, as written into the DMT modem standards, calls for increasing the length of each symbol by a small number of samples (i.e., C, shown as 104). These extra samples can then be ignored by the receiving modem, given that they are expected to be polluted with ISI. These additional samples, however, are wasted from the point of view of transmitting information. As a result, C should be kept small relative to N. In practice, the value of C is about 6% to 8% of N. This is much less than the true length of the unit-sample response of physical channels. Therefore, the cyclic prefix modem often includes an additional component, the TEQ, to shorten the length of the composite channel/TEQ unit-sample response to an acceptable value.

Adaptive equalizers for telephone channels are known, but the problem of shortening the length of the composite response (i.e., channel response plus TEQ unit-sample response) is different than problems faced by modems that employ adaptive equalizers. In simpler terms, adaptive equalizers normally are designed such that the convolution of the channel unit-sample response with that of the adaptive equalizer yields a single unit-impulse, thereby eliminating ISI. Because DMT modems perform further equalization in the frequency domain during later steps of signal processing the receiver, the requirements on the TEQ are different from those placed, for example, on the adaptive equalizers used in voice-band modems. The normal adaptive equalizer works to shorten the length of the composite unit-sample response to one; the TEQ works to shorten the composite unit-sample response to a value less than, or equal to, C. FIG. 1B shows a graphical example of the composite unit response h(n)*a (n) (106) being shortened to a value approximately less than C (104).

In practice, the analog channel is generally unknown before the modem is installed on a given DSL. Therefore the TEQ must be designed on the fly using algorithms that learn the characteristics of the analog channel and synthesize the appropriate TEQ. Known prior art includes the following: Chow, J. S.; Cioffi, J. M.; Bingham, J. A. C.—"Equalizer training algorithms for multicarrier modulation systems," Conference Record of IEEE International Conference on Communications, Geneva, Vol. 2, 1993. This reference describes an iterative method that uses frequency-domain calculations to derive the TEQ. The frequency-domain method is problematic as it does not guarantee convergence to a solution. Moreover, the iterative nature of the process requires certain judgments to be performed along the way in order to reach a workable solution.

Accordingly, what is needed in the field of art is a non-iterative method of designing a TEQ for a DSL modem, and in particular, a method applicable to an ADSL (or other type) modem that employs DMT. This non-iterative method should provide a solution wherein the output of the TEQ has a duration less than C and a solution that is deterministic without concerns of non-convergence.

SUMMARY OF THE INVENTION

The present invention provides a non-iterative method of designing a TEQ for an xDSL (i.e., ADSL, DSL, or otherwise) modem that employs DMT modulation. The method is straightforward and performs the related calculations in the time domain (rather than the frequency domain).

DMT modems transmit information codes in symbols consisting of blocks of length N of time-domain samples. N also serves as the duration of the estimated channel unit-sample response. The present method utilizes $H(z)$, with a degree of $N-1$, to represent the discrete-time version of the analog channel. A chosen signal $B(z)$ represents the discrete-time version of the allowed residual output of the TEQ, having a degree of $K-1$. The TEQ has a discrete-time response signal $A(z)$ with a degree $M-1$. Each of these signals is expressed as a polynomial with varied degrees and coefficients. The discrete-time signal $H(z)$ is expressed as a polynomial of the order $Z^{-N+1}$ having coefficients $h_j$, wherein $K<M<N$, and $K<=C$. The error signal is expressed as the discrete-time signal $E(z)=A(z)H(z)-B(z)$ as a polynomial of the order $Z^{N-1}$ having coefficients $e_i$. The TEQ is expressed as the discrete-time signal $A(z)$ as a polynomial of the order $Z^{-M+1}$ having coefficients $a_j$. The method next equates the coefficients of the same order on each side of the equation for $E(z)$. This arrangement allows for the determination of the coefficients of $e_i$ in terms of $a_j$, $b_j$ and $h_j$, and the coefficients are equated on either side of this expressed relationship. Thereafter, the coefficients $h_j$ can be directly derived from the receiver training estimates of the channel. This forms an error signal in terms of the coefficients $a_j$ and $b_j$. Thereafter, a process is applied so that the error signal is minimized, and the coefficients $a_j$ and $b_j$ can be solved for and applied to the design solution of the desired TEQ.

Minimization of the error signal might be performed according to the following: first determining the partial derivatives of the error signal with respect to $a_j$ and $b_j$. Thereafter, these partial derivatives are set to zero and solved to provide a series of error signal coefficients $e_i$. Next, the method substitutes the values of the coefficients of $e_i$ in terms of $a_j$, $b_j$ and $h_j$ and derives a matrix of corresponding equations having the terms $a_j$, $b_j$ and $h_j$. The matrix is arranged as a product of the matrix and a vector having the desired coefficients arranged as $b_0$ through $b_j$ and $a_0$ through $a_j$. This product is set equal to a zero vector. The method takes advantage that the first desired coefficient $b_0$ can be set to one. Thereafter (as before), the coefficients $h_j$ are determined from the receiver training estimates. This leaves an equation in terms of only the unknown vector of desired coefficients. These coefficients are solved for, such that the error signal is minimized, and the coefficients $a_0$ through $a_j$ provide the resulting TEQ to be used in a receiver.

As a further refinement, the residual signal $B(z)$ can be formulated to have a desired frequency response that is flat over the middle of the band, with raised-cosine roll-off at the edges. The present invention encompasses both a method of designing the TEQ and a TEQ apparatus designed for use with an appropriate receiver.

One aspect of the present invention provides for a non-iterative method of forming a time-domain equalizer for a receiver device associated with a channel, the method comprising the steps of: forming a discrete-time representation of channel response $H(z)$, followed by a discrete-time representation of time-domain equalizer response $A(z)$; choosing a signal which represents an allowed residual output $B(z)$ of the time-domain equalizer; arranging the formed signals with a summation device to form an error signal of $E(z)=H(z)A(z)-B(z)=0$; inputting a unit one signal to the channel response and deriving the relationships $B(z)=H(z)A(z)$, and $H(z)=B(z)/A(z)$; deriving an expression for the error signal in terms of coefficients corresponding to $A(z)$, $B(z)$ and $H(z)$; minimizing the error signal; deriving the coefficients corresponding to $H(z)$ from the receiver training estimates; and solving for the coefficients corresponding to $A(z)$ and $B(z)$, wherein $B(z)$ has a degree less than the cyclic prefix C, and the coefficients corresponding to $A(z)$ provide the time-domain equalizer.

Still another aspect provides for a non-iterative method of forming a time-domain equalizer for a receiver device using discrete multitone modulation in association with a channel, the method comprising the steps of: forming a discrete-time representation of channel response having corresponding coefficients; forming a discrete-time representation of time-domain equalizer (TEQ) response having corresponding coefficients, the channel response and TEQ response being arranged to form a combined response; choosing a residual output signal of the time-domain equalizer having corresponding coefficients and choosing the signal so that its degree is less than a cyclic prefix C; arranging the formed signals with a summation device to form an error signal= (combined response)−(residual response); inputting a unit one signal to the channel response and setting the error signal=0, and deriving the relationship of (combined response)=(residual response); deriving an expression for the error signal having corresponding coefficients formed in terms of the coefficients corresponding to the combined response and the residual response; minimizing the error signal; deriving the coefficients corresponding to the channel response from receiver training estimates; and solving for the coefficients corresponding to the TEQ and the residual output signal.

Yet another aspect of the present invention provides for a time-domain equalizer (TEQ) apparatus formed in a non-iterative manner in a processor device having associated storage capability, the apparatus comprising: a channel having a channel response with corresponding coefficients; a (TEQ) with a response having stored coefficients, the channel response and TEQ response being arranged to form a combined response; a residual output signal of the time-domain equalizer, the signal having stored coefficients and chosen so that the degree of the signal is less than a cyclic prefix C; a summation device for arranging the formed signals into an error signal=(combined response)−(residual response); a unit one-signal input to the channel response, whereby the error signal is set to zero, and the relationship becomes (combined response)=(residual response); a set of stored coefficients of the energy signal that are determined in terms of the stored coefficients corresponding to the combined response and the residual response; whereby the error signal is minimized, the coefficients corresponding to channel response are derived from receiver training estimates, and the coefficients corresponding to the TEQ and residual output signal are derived such that the error signal is minimized.

The above and other features, aspects, and advantages of the present invention will become apparent from the following descriptions and attached drawings.

BRIEF DESCRIPTION OF THE DRAWINGS

Certain aspects and advantages of the present invention will be apparent upon reference to the accompanying description when taken in conjunction with the following drawings, which are exemplary, wherein.

DESCRIPTION OF THE PREFERRED EMBODIMENTS

The present invention is described below in terms of certain preferred embodiments and representative applications. It is meant to be generally applicable to all systems and not meant to be limited to any specific configurations described herein.

Figure 1A:
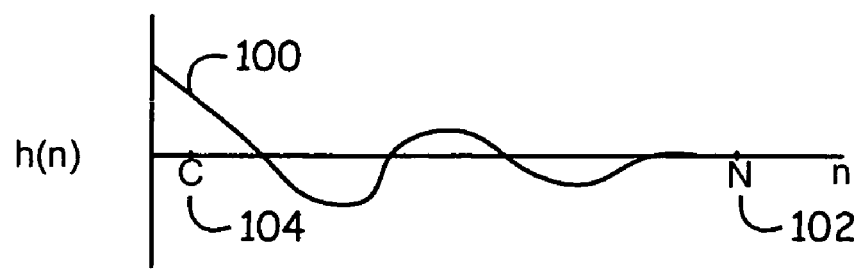
FIG. 1A is a plot of a channel response h(n) of approximate length N, having a cyclic prefix C.
Figure 1B:
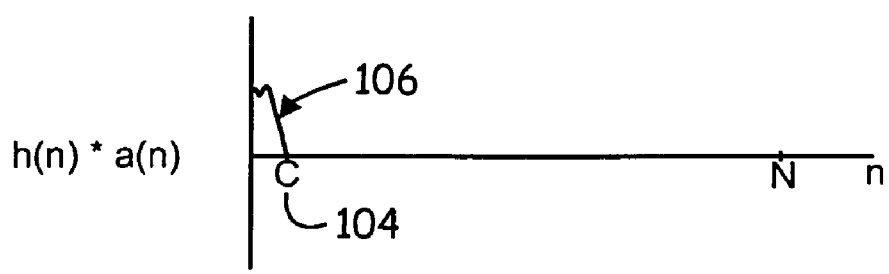
FIG. 1B is a plot of a combined channel response and TEQ response—h(n)*a(n)—that is designed to be approximately less than the cyclic prefix C.
Figure 2:
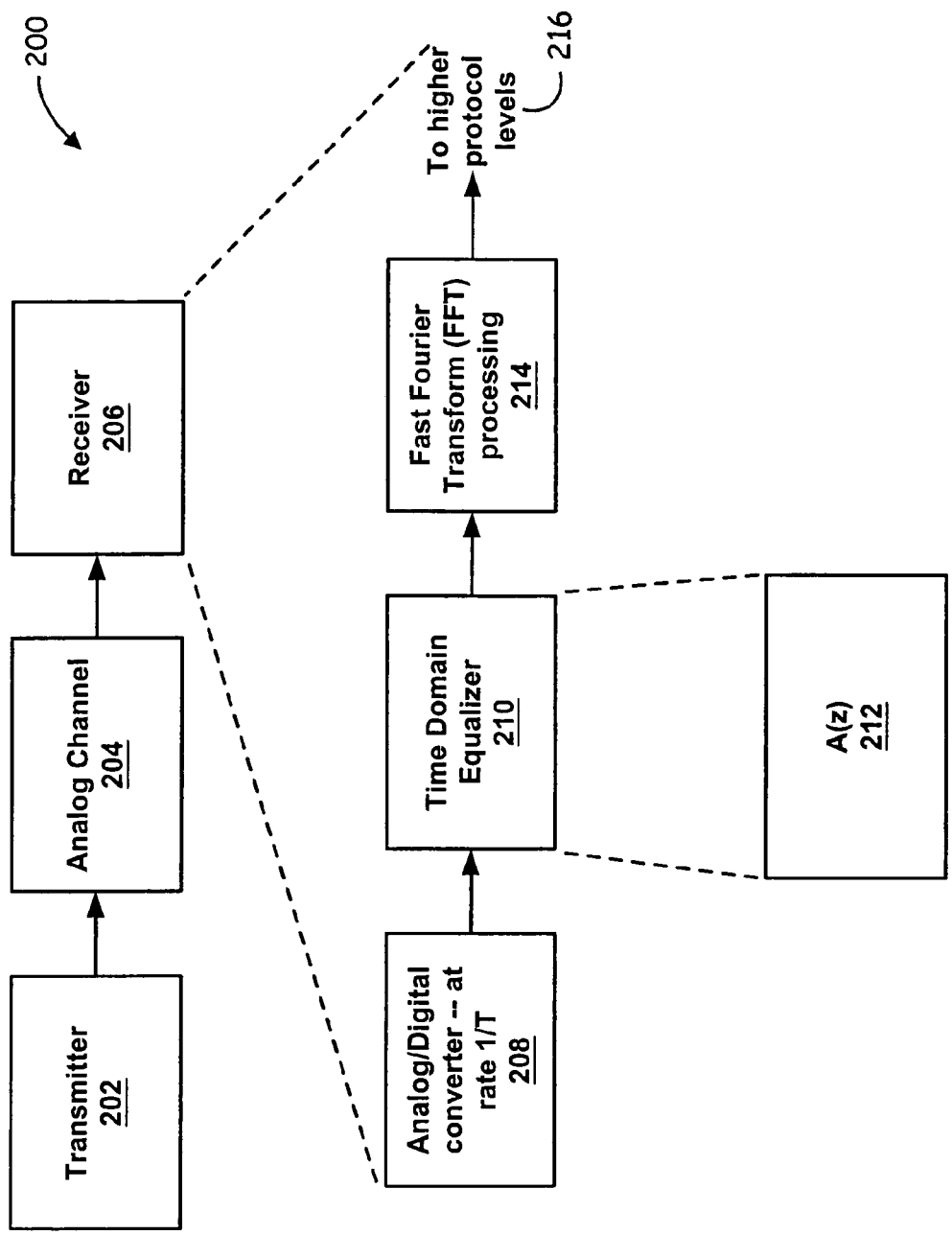
FIG. 2 is a block diagram of a transmitter, channel and receiver, with the receiver further detailed to include a TEQ with a response A(z).

The present invention is a non-iterative method of designing a TEQ for any application that might use one. FIG. 2 shows a representative block diagram 200 of a transmitter 202, which sends a signal through an analog channel 204, which is then received by a receiver 206. The receiver is then further comprised of an analog-to-digital convener 208, which converts at a rate of 1/T (with T being the period of the incoming signal). The signal is then passed to a Time Domain Equalizer (TEQ) 210, which is shown to have a z-domain response of A(z) 212. The equalized signal is thereafter passed to a Fast Fourier Transform (FFT) 214 for conversion of the signal. Thereafter, the signal is shown passing to higher protocol levels 216 uf the receiver 206.

In one particularized embodiment, a TEQ is provided for use in an ADSL modem that might employ DMT modulation (or the like). The transmitter might be representatively shown as an ATU-C, which stands for ADSL Termination Unit—Central (Office). The receiver might be representatively shown as an ATU-R, which stands for ADSL Termination Unit—Remote. These two devices are the ADSL modems that sit on either side of the telephone company's (telco) copper loop. The ATU-R can be a self-contained box suitable for customer use, including an AC adapter for powering the device. The ATU-C is generally packaged into Central Office type equipment.

The channel response H(z) is modeled as an autoregressive moving average (ARMA) in the form of equation (2). Two key parameters are chosen to begin the design: M, which is the degree of A(z), the Autoregressive (AR) portion of the model; K, which is the degree of the B(z), the moving average (MA) portion of the model. The choice of K can simply be chosen to equal C, the length of the cyclic prefix standard in the modem standard. The choice of M depends more so on the design of the TEQ, which is detailed below.

Figure 3:
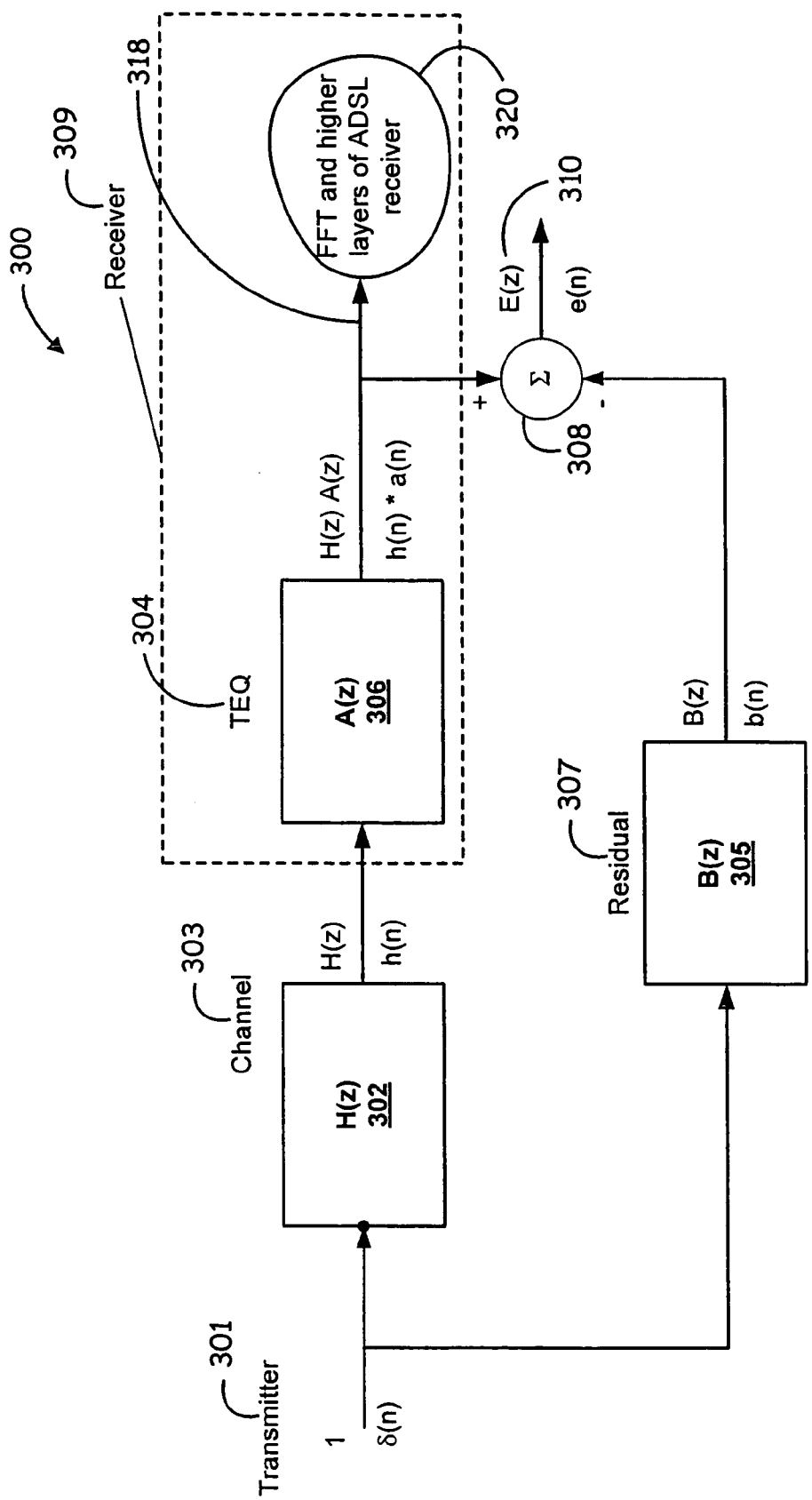
FIG. 3 is a block diagram showing the relations between the transmitter, channel, receiver (including TEQ) and a residual output signal, according to one aspect of the present invention.

The invention meets this less stringent requirement (i.e., for choosing K) by means of an approach summarized in the block diagram 300 of FIG. 3, for example. In FIG. 3, H(z) 302 represents the discrete-time version of the analog channel 303. The output of H(z) is representatively shown in discrete-time as H(z), above the connecting arrows, and also in the time-domain as h(n) below the connecting arrows. Discrete-time and time-domain signals are similarly shown (above/below) for the other elements A(z), B(z), E(z), (i.e. a(n), b(n), and e(n) respectively), and the input signal "1" or δ(n). The transmitter portion 301 is shown before the input to the channel 303, and the receiver portion 309 is shown to include the TEQ 304.

A primary requirement on the TEQ 304 is that its output in FIG. 3 shall have a duration less than C. The discrete-time representation A(z) is shown as 306. To formalize this requirement, the method includes the introduction of a carefully chosen signal, B(z) 305. B(z) represents the allowed residual output of TEQ in FIG. 3. An idealized filter 307 having transfer function B(z) is connected as shown in FIG. 3. The requirement on TEQ then becomes equivalent to the condition $$E(z)=0 \tag{1}$$

wherein E(z) 310 is shown at the output of the summation device 308, having a form E(z)=H(z)A(z)−B(z). A suitable structure for the TEQ next needs to be determined, along with the residual B(z). The present invention provides a representative method for determining the coefficients comprising the residual B(z).

In this representative example, the channel 303 is known to have transfer function $$H(z) = \frac{B(z)}{A(z)}. \tag{2}$$

Thereafter, with a "1" being used as the z-transform of the input (or unit input) to the system in FIG. 3, the output of the Channel/TEQ cascade (302 and 306) becomes $$H(z)A(z)=B(z), \quad (3)$$

with the output E(z) 310 of the summation circle 308 being set to zero. Further, if the degree of B(z) is less than C then the output of TEQ in FIG. 3 exhibits the properties required by a DMT receiver.

Following through on this formulation, the present solution utilizes a representative formulation wherein both A(z) and B(z) are polynomials in $z^{-1}$ given by $$A(z)=a_o+a_1 z^{-1}+a_2 z^{-2}+\ldots+a_{M-1}z^{-M+1} \quad (4)$$

$$B(z)=b_0+b_1 z^{-1}+b_2 z^{-2}+\ldots+b_{K-1}z^{-k+1}. \quad (5)$$

Additionally, notwithstanding equation (2), the formulation utilizes the representation given by $$H(z)=h_0+h_1 z^{-1}+h_2 z^{-2}+\ldots+h_{N-1}z^{-N+1}. \quad (6)$$

The formulation further assumes that K<M<N, and that K≦C.

The coefficients, $\{h_0, h_1, \ldots, h_{N-1}\}$ can be considered known because the training procedure for DMT modems includes a step for measuring the channel. The general relationships depicted in FIG. 3 now can be written as:

$$E(z)=H(z)A(z)-B(z). \quad (7)$$

Thereafter, by representing E(z) as the polynomial:

$$E(z)=e_0+e_1 z^{-1}+e_2 z^{-2}+\ldots, \quad (8)$$

equation (7) can further be expanded into $$(e_0+e_1 z^{-1}+e_2 z^{-2}+\ldots)=(h_0+h_1 z^{-1}+h_2 z^{-2}+\ldots+h_{N-1}z^{-N+1})(a_0+a_1 z^{-1}+a_2 z^{-2}+\ldots+a_{M-1}z^{-M+1})-(b_0+b_1 z^{-1}+b_2 z^{-2}+\ldots+b_{K-1}z^{-K+1}) \quad (9)$$

The coefficients of the error signal, E(z), can be obtained by equating the coefficients of equal powers of $z^{-1}$ on both sides of (9). The results are $$e_0 = h_0 a_0 - b_0 \quad (10)$$

$$e_1 = h_1 a_0 + h_0 a_1 - b_1 \quad (11)$$

$$e_2 = h_2 a_0 + h_1 a_1 + h_0 a_2 - b_2 \quad (12)$$

$$e_{K-1} = h_{K-1} a_0 + h_{K-2} a_1 + \ldots + h_0 a_{K-1} - b_{K-1} \quad (13)$$

$$e_K = h_K a_0 + h_{K-1} a_1 + \ldots + h_0 a_K \quad (14)$$

$$e_{M-1} = h_{M-1} a_0 + h_{M-2} a_2 + \ldots + h_0 a_{M-1} \quad (15)$$

$$e_M = h_M a_0 + h_{M-1} a_1 + \ldots + h_1 a_{M-1} \quad (16)$$

$$e_{N-1} = h_{N-1} a_0 + h_{N-2} a_1 + \ldots + h_{N-M} a_{M-1} \quad (17)$$

Equations (10) through (17) can be written more compactly as $$e_i = \sum_{j=0}^{i} h_{i-j} a_j - b_i, \ 0 \le i < K \quad (18)$$

$$e_i = \sum_{j=0}^{i} h_{i-j} a_j, \ K \le i < M \quad (19)$$

$$e_i = \sum_{j=0}^{M-1} h_{i-j} a_j, \ M \le i < N \quad (20)$$

Although the error signal should ideally be zero, that condition can seldom be achieved in practice. Rather, the modem designer must be satisfied with an error signal, e(n), the energy of which is sufficiently small. Accordingly, design of the TEQ is accomplished by choosing $\{a_j; j=0, 1, \ldots, M-1\}$ and $\{b_j; j=0, 1, \ldots, K-1\}$ such that $$E = \sum_{i=0}^{N-1} e_i^2 \quad (21)$$

is minimized.

Minimization of E—Necessary conditions that E be minimized are $$\frac{\partial E}{\partial b_j} = 0, \ j = 0, 1, \ldots, K-1 \text{ and} \quad (22)$$

$$\frac{\partial E}{\partial a_j} = 0, \ j = 0, 1, \ldots, M-1. \quad (23)$$

Equations (22) and (23) can eventually be solved for $\{a_0, a_1, \ldots, a_{M-1}\}$ and $\{b_0, b_1, \ldots, b_{k-1}\}$. This solution requires going through several steps as follows:

First, the partial derivatives are obtained as follows:

$$\frac{\partial E}{\partial b_j} = -2e_j, \ 0 \le j < K \quad (24)$$

$$\frac{\partial E}{\partial a_j} = \sum_{i=j}^{N-1} 2e_i h_{i-j}, \ 0 \le j < M \quad (25)$$

When the partial derivatives are set to zero, the following is obtained:

$$e_j = 0, 0 \le j < K \quad (26)$$

$$\sum_{i=j}^{N-1} e_i h_{i-j} = 0, \ 0 \le j < M. \quad (27)$$

Expressed in another form, the following set of equations are provided, that is:

$$e_0 = 0 \quad (28)$$

$$e_1 \ldots = 0 \quad (29)$$

$$\ldots \ e_{K-1} = 0 \quad (30)$$

$$e_0 h_0 + e_1 h_1 + e_2 h_2 + \ldots + e_{N-1} h_{N-1} = 0 \quad (31)$$

$$e_1 h_0 + e_2 h_1 + \ldots + e_{N-1} h_{N-1} = 0 \quad (32)$$

$$e_{M-1} h_0 + e_M h_1 + \ldots + e_{N-1} h_{N-M} = 0 \quad (33)$$

The method next substitutes equations (18) through (20) into equations (26) and (27). The results are as follows:

$$b_0 \quad -h_0 a_0 = 0 \quad (34)$$

$$b_1 \quad -h_1 a_0 \quad -h_0 a_1 = 0 \quad (35)$$

$$\ldots \quad \ldots$$

$$b_{K-1} \quad -h_{K-1}a_0 \quad -h_{K-2}a_1 - \ldots \quad -h_0 a_{K-1} = 0 \quad (36)$$

$$-h_0 b_0 \quad -h_1 b_1 \ldots \quad -h_{K-1}b_{K-1} \quad +r_{00}a_0 \quad +r_{01}a_1 + \ldots \quad +r_{0,M-1}a_{M-1} = 0 \quad (37)$$

$$-h_0 b_1 \ldots \quad -h_{K-2}b_{K-1} \quad +r_{10}a_0 \quad +r_{11}a_1 + \ldots \quad +r_{1,M-1}a_{M-1} = 0 \quad (38)$$

$$\ldots \quad \ldots$$

$$-h_0 b_{K-1} \quad +r_{K-1,0}a_0 \quad +r_{K-1,1}a_1 + \ldots \quad +r_{K-1,M-1}a_{M-1} = 0 \quad (39)$$

$$r_{K0}a_0 \quad +r_{K1}a_1 + \ldots \quad +r_{K,M-1}a_{M-1} = 0 \quad (40)$$

$$\ldots \quad \ldots$$

$$r_{M-1,0}a_0 \quad +r_{M-1,1}a_1 + \ldots \quad +r_{M-1,M-1}a_{M-1} = 0 \quad (41)$$

Equations (34) through (41) are more conveniently expressed in matrix form as $$\begin{vmatrix} 1 & 0 & \ldots & 0 & -h_0 & 0 & 0 & \ldots & \ldots & 0 & 0 \\ 0 & 1 & \ldots & 0 & -h_1 & -h_0 & 0 & \ldots & \ldots & 0 & 0 \\ \ldots & \ldots & \ldots & \ldots & \ldots & \ldots & \ldots & \ldots & \ldots & \ldots & \ldots \\ 0 & 0 & \ldots & 1 & -h_{K-1} & -h_{K-2} & \ldots & \ldots & -h_0 & 0 & 0 \\ -h_0 & -h_1 & \ldots & -h_{K-1} & r_{00} & r_{01} & \ldots & \ldots & \ldots & \ldots & r_{0,M-1} \\ 0 & -h_0 & \ldots & -h_{K-2} & r_{01} & r_{11} & \ldots & \ldots & \ldots & \ldots & r_{1,M-1} \\ \ldots & \ldots & \ldots & \ldots & \ldots & \ldots & \ldots & \ldots & \ldots & \ldots & \ldots \\ 0 & 0 & \ldots & -h_0 & r_{K-1,0} & r_{K-1,1} & \ldots & \ldots & \ldots & \ldots & r_{K-1,M-1} \\ \ldots & \ldots & \ldots & \ldots & r_{K0} & r_{K1} & \ldots & \ldots & \ldots & \ldots & r_{K,M-1} \\ 0 & 0 & \ldots & 0 & \ldots & \ldots & \ldots & \ldots & \ldots & \ldots & \ldots \\ 0 & 0 & \ldots & 0 & r_{M-1,0} & r_{M-1,1} & \ldots & \ldots & \ldots & \ldots & r_{M-1,M-1} \end{vmatrix} \begin{vmatrix} b_0 \\ b_1 \\ \ldots \\ \ldots \\ \ldots \\ b_{K-1} \\ a_0 \\ a_1 \\ \ldots \\ \ldots \\ a_{M-1} \end{vmatrix} = \begin{vmatrix} 0 \\ 0 \\ 0 \\ \ldots \\ \ldots \\ \ldots \\ \ldots \\ \ldots \\ \ldots \\ \ldots \\ 0 \end{vmatrix} \quad (42)$$

where the $\{r_{ij}; 0 \leq i, j < M\}$ are elements of the M×M matrix R defined by the product $$R = \begin{vmatrix} h_0 & h_1 & h_2 & \ldots & h_{N-1} \\ 0 & h_0 & h_1 & \ldots & h_{N-2} \\ 0 & 0 & h_0 & \ldots & h_{N-3} \\ \ldots & \ldots & \ldots & \ldots & \ldots \\ 0 & 0 & 0 & \ldots & h_{N-M} \end{vmatrix} \begin{vmatrix} h_0 & 0 & 0 & \ldots & 0 \\ h_1 & h_0 & 0 & \ldots & 0 \\ h_2 & h_1 & h_0 & \ldots & 0 \\ \ldots & \ldots & \ldots & \ldots & \ldots \\ h_{N-1} & h_{N-2} & h_{N-3} & \ldots & h_{N-M} \end{vmatrix} \quad (43)$$

The homogeneous system of equations (42) has the trivial solution $$b_0 = b_1 = \ldots = b_{K-1} = a_0 = a_1 = \ldots = a_{K-1} = 0 \quad (44)$$

but a more useful solution can be derived by solving for $b_1, \ldots, b_{K-1}, a_0, a_1, \ldots,$ and $a_{M-1}$ in terms of $b_0$. Moreover, the solution is intended to be proportional to $b_0$, and therefore no generality is lost by setting $$b_0 = 1. \quad (45)$$

Replacing the first equation in (42) with (45), the resulting set of equations is $$\begin{vmatrix} 1 & 0 & \ldots & 0 & 0 & 0 & 0 & \ldots & \ldots & 0 & 0 \\ 0 & 1 & \ldots & 0 & -h_1 & -h_0 & 0 & \ldots & \ldots & 0 & 0 \\ \ldots & \ldots & \ldots & \ldots & \ldots & \ldots & \ldots & \ldots & \ldots & \ldots & \ldots \\ 0 & 0 & \ldots & 1 & -h_{K-1} & -h_{K-2} & \ldots & -h_0 & \ldots & 0 & 0 \\ -h_0 & -h_1 & \ldots & -h_{K-1} & r_{00} & r_{01} & \ldots & r_{0,K-1} & \ldots & \ldots & r_{0,M-1} \\ 0 & -h_0 & \ldots & -h_{K-2} & r_{01} & r_{11} & \ldots & r_{1,K-1} & \ldots & \ldots & r_{1,M-1} \\ \ldots & \ldots & \ldots & \ldots & \ldots & \ldots & \ldots & \ldots & \ldots & \ldots & \ldots \\ 0 & 0 & \ldots & -h_0 & r_{K-1,0} & r_{K-1,1} & \ldots & \ldots & \ldots & \ldots & r_{K-1,M-1} \\ \ldots & \ldots & \ldots & \ldots & r_{K0} & r_{K1} & \ldots & \ldots & \ldots & \ldots & r_{K,M-1} \\ 0 & 0 & \ldots & 0 & \ldots & \ldots & \ldots & \ldots & \ldots & \ldots & \ldots \\ 0 & 0 & \ldots & 0 & r_{M-1,0} & r_{M-1,1} & \ldots & \ldots & \ldots & \ldots & r_{M-1,M-1} \end{vmatrix} \begin{vmatrix} b_0 \\ b_1 \\ \ldots \\ \ldots \\ \ldots \\ b_{K-1} \\ a_0 \\ a_1 \\ \ldots \\ \ldots \\ a_{M-1} \end{vmatrix} = \begin{vmatrix} 1 \\ 0 \\ 0 \\ \ldots \\ \ldots \\ \ldots \\ \ldots \\ \ldots \\ \ldots \\ \ldots \\ 0 \end{vmatrix}. \quad (46)$$

The solution to (46) defines the coefficients of A(z) and B(z) in FIG. 3.

Whereas the solution to (46) is relatively straightforward, it will require a certain amount of processor capability, particularly depending upon the order of the equations involved. This requirement, however, is well within the capabilities of processors used to implement DMT-based DSL modems. The elements, $\{a_0, a \ldots, a_{M-1}\}$, of the resulting solution are the required coefficients of the TEQ.

During training, the ADSL receiver estimates the channel, which is to say it measures the values of $\{h_0, h_1, \ldots, h_{N-1}\}$. From there the value of R from equation (43) can be directly computed. The solution method thereafter substitutes the elements of R into equation (46) and solves for the coefficients $\{b_1 \ldots, b_{K-1}, a_0, a_1, \ldots, a_{M-1}\}$.

Refinement of the method. The method outlined above sometimes leads to conditions where the frequency response corresponding to B(z) exhibits an undesirable dip in the center of the frequency band. To avoid this situation, the response of B(z) can be chosen a priori to have a desired frequency response that is flat over the middle of the band with raised-cosine roll-off at the edges. The general method above is thereafter applied, and a reduced form of equation (46) is solved for the coefficients $\{a_0, a_1 \ldots, a_{M-1}\}$. This approach might be construed as compromising the condition of E that is being minimized in equation (21). However, the dip in the frequency response of B(z) is similarly compensated (and/or eliminated), and this has been found to be more desirable in many situations.

The coefficients $\{a_0, a_1 \ldots, a_{M-1}\}$ represent the solution for the TEQ. Referring again to FIG. 3, the output 318 of the TEQ is passed onto an FFT and higher levels of the ADSL (or other type) receiver, with these higher levels shown represented as 320.

Figure 4:
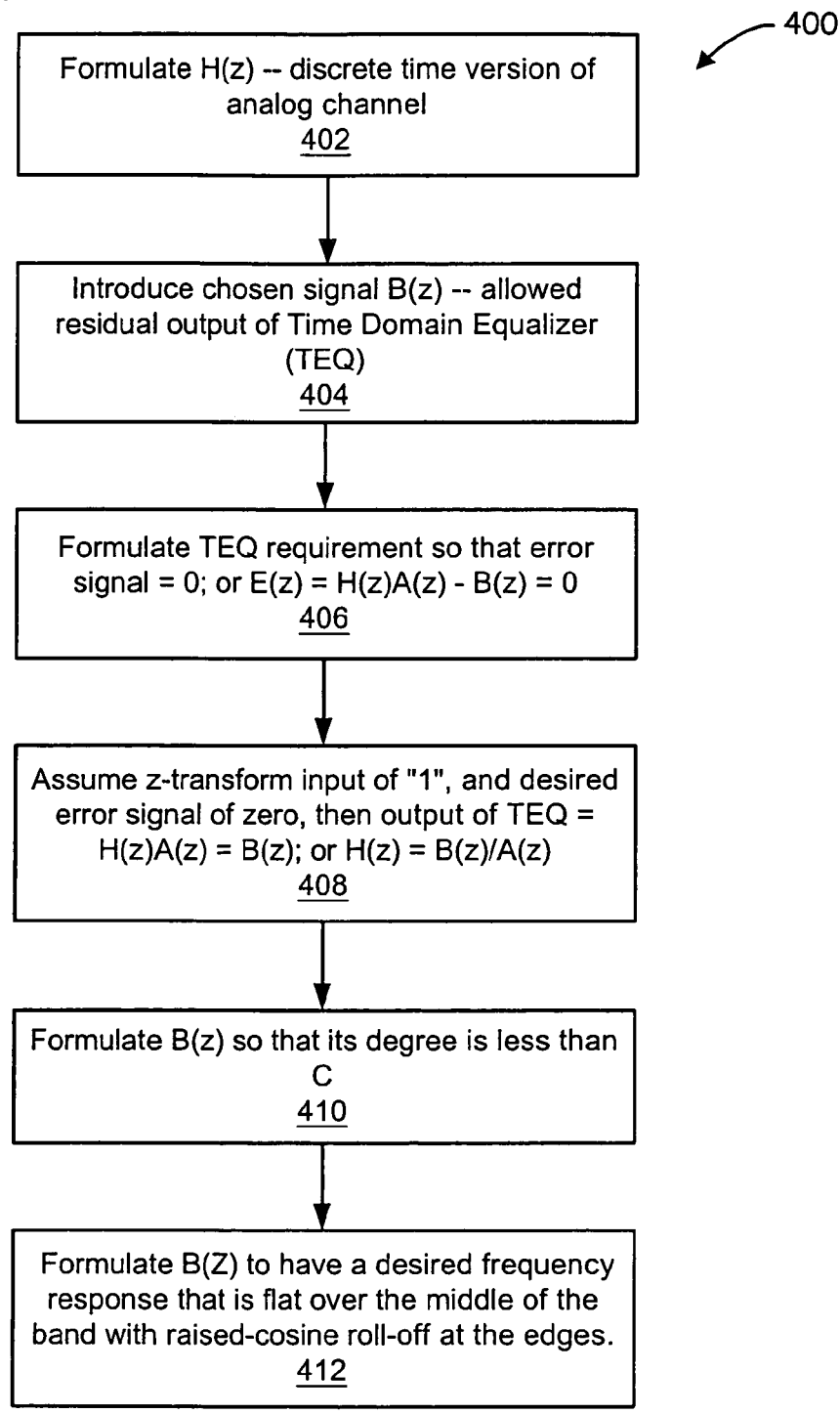
FIG. 4 is a flowchart showing a generalized flow of steps, according to one aspect of the present invention.

A series of flowcharts is next presented which shows certain representative steps that might be used to implement the present method. FIG. 4 shows a generalized flow of steps 400. In step 402, the discrete-time version H(z) is formulated from the analog channel of the system to which the TEQ is being applied. In step 404, a signal B(z) is introduced which is a chosen signal representing the allowed residual output of the TEQ. In step 406, the requirement for the TEQ is formulated so that the error signal is zero, with E(z)=H(z)A(z)−B(z). Thereafter, in step 408, the z-transform of the input signal is assumed to be "1," and with an error signal of zero, and therefore H(z)=B(z)/A(z) and similarly B(z)=H(z)A(z). In step 410, the signal B(z) is next formulated so that its degree is less than the cyclic prefix C. In terms of the refinement discussed above, an optional step 412 might involve further formulating the signal B(z) to have a desired frequency response that is flat over the middle of the band with raised-cosine roll-off at the edges.

Figure 5:
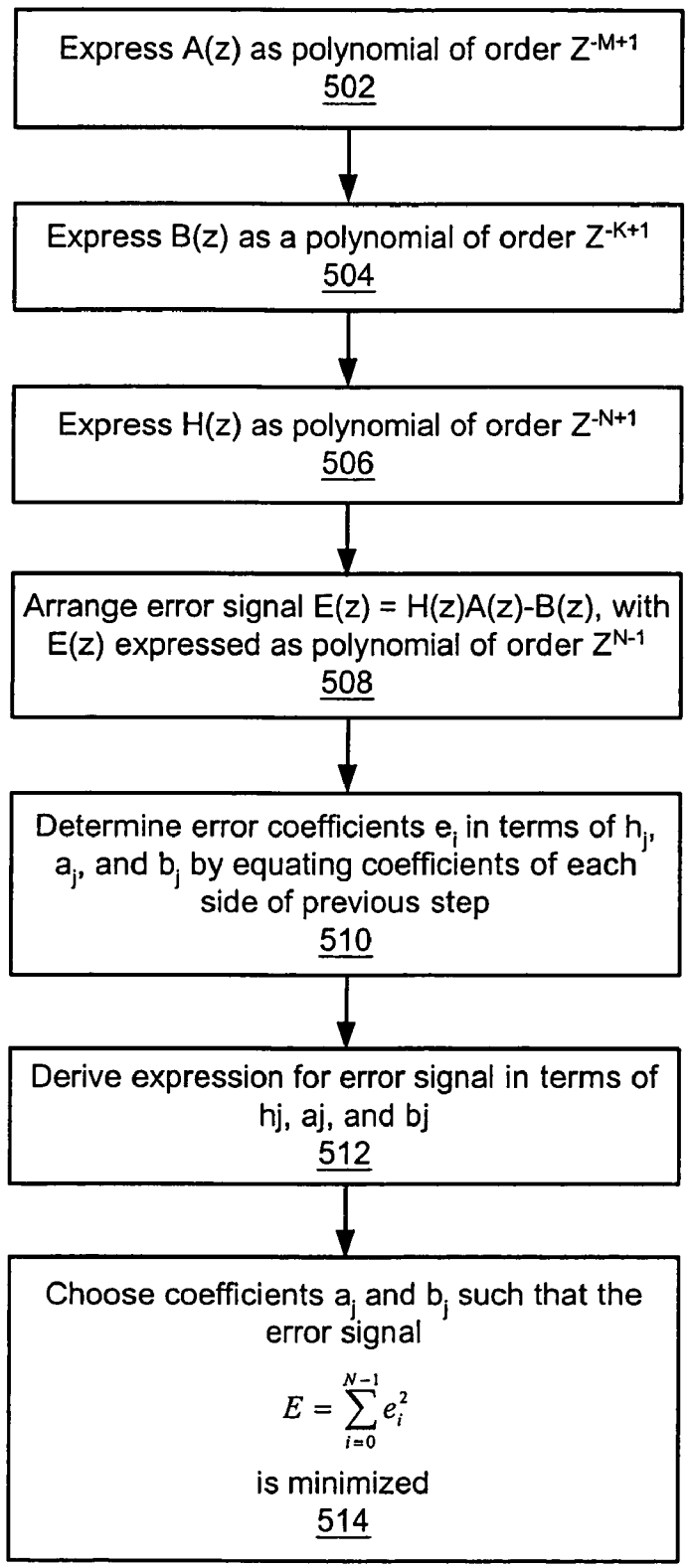
FIG. 5 is a flowchart showing representative steps for formulating B(z), according to one aspect of the present invention.

FIG. 5 next shows certain representative steps 500 to be used in further formulating the response B(z), which thereafter leads to solving for the coefficients $a_j$ of the TEQ. In step 502, the discrete-time signal A(z) is expressed as a polynomial of the order $Z^{-M+1}$. In step 504, the discrete-time signal B(z) is expressed as a polynomial of the order $Z^{-K+1}$. In step 506, the discrete-time signal H(z) is expressed as a polynomial of the order $Z^{-N+1}$. Thereafter, in step 508, the discrete-time signal E(z) is expressed as a polynomial of the order $Z^{N-1}$, and the polynomial elements are arranged according to the formula E(z)=H(z)A(z)−B(z). In step 510, the error coefficients $e_i$ are determined in terms of $h_j$, $a_j$ and $b_j$ by equating the coefficients of each side of the equation presented in step 508. Thereafter, in step 512, an expression is derived for the error signal in terms of $h_j$, $a_j$ and $b_j$. In step 514, since the coefficients of the channel response (h) are generally known from the receiver training estimates, it becomes necessary to choose coefficients, $a_j$ and $b_j$ such that the error signal, shown in equation (21), is minimized.

Figure 6:
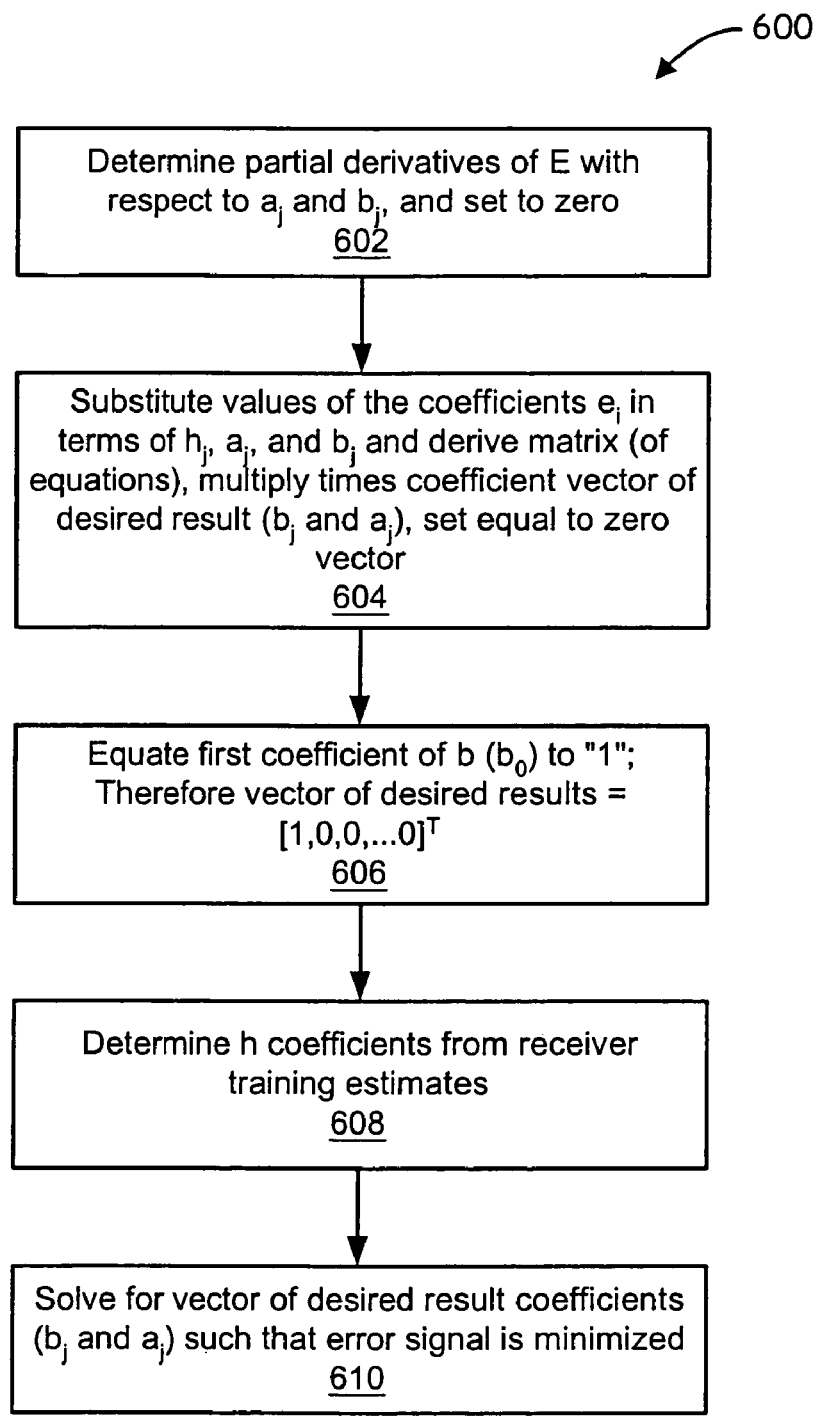
FIG. 6 is a flowchart showing representative steps of minimizing the error signal, according to one aspect of the present invention.

FIG. 6 next shows a series of representative steps 600 which might be used to minimize the error signal and thereby provide the requisite conditions on the coefficients, $a_j$ and $b_j$. In step 602, partial derivatives are taken of E with respect to $a_j$ and $b_j$, and these derivatives are set to zero. In step 604, certain coefficients $e_i$ exist in the expanded set of partial derivative equations. These coefficients $e_i$ have equivalent values in terms of $h_j$, $a_j$ and $b_j$, and these values are substituted into the expanded set of equations. The result is formulated in terms of a matrix which is multiplied times a vector of coefficients $a_j$ and $b_j$ and then set equal to a zero vector. In step 606, it is understood that the first coefficient of $b_j$ ($b_0$) can be set to "1." The resultant vector is therefore the transposed form of [1,0,0, ... 0]. In step 608, it is shown that the $h_j$ coefficients can be determined from the receiver training estimates. In step 610, a solution is found for the vector of the desired result coefficients ($a_j = a_0 - a_{M-1}$ and $b_j = b_0 - b_{K-1}$) such that the error signal is minimized. The set of coefficients $a_j$ represents the design parameters of the TEQ, and the coefficients $b_j$ represent the parameters of the residual signal that should be applied to the system (as per FIG. 3).

Accordingly, this solution for the TEQ is non-iterative and provides a convergent set of values for system. Although the present invention has been particularly shown and described above with reference to specific embodiment(s), it is anticipated that alterations and modifications thereof will no doubt become apparent to those skilled in the art. It is therefore intended that the following claims be interpreted as covering all such alterations and modifications as fall within the true spirit and scope of the invention.

The invention claimed is:

1. A non-iterative method of forming a time-domain equalizer for a receiver device associated with a channel, the method comprising the steps of:
    forming a discrete-time representation of channel response H(z), followed by a discrete-time representation of time-domain equalizer response A(z,);
    choosing a signal which represents an allowed residual output B(z) of the time-domain equalizer;
    arranging A(z), B(z), and H(z) with a summation device to form an error signal of E(z)=H(z)A(z)−B(z)=0;
    inputting a unit one signal to the channel response and deriving the relationships B(z)=H(z)A(z), and H(z)=B(z)/A(z);
    deriving an expression for the error signal in terms of coefficients corresponding to A(z,), B(z) and H(z);
    minimizing the error signal;
    deriving the coefficients corresponding to H(z) from receiver training estimate; and
    solving for the coefficients corresponding to A(z), wherein the coefficients corresponding to A(z) provide the time-domain equalizer.

2. The method of claim 1, wherein the step of choosing the signal B(z) includes formulating the signal to have a desired frequency response that is flat over the middle of the band.

3. The method of claim 2, wherein the signal B(z) is also formulated to have raised-cosine roll-off at the edges.

4. The method of claim 1, wherein the receiver utilizes discrete multitone (DMT) modulation.

5. The method of claim 1, wherein the steps further include:
   expressing A(z) as a polynomial of the order $Z^{-M+1}$ having coefficients $a_j$;
   expressing B(z) as a polynomial of the order $Z^{-K+1}$ having coefficients $b_j$;
   expressing the discrete-time signal H(z) as a polynomial of the order $Z^{-N+1}$ having coefficients $h_j$, wherein K<M<N, and K<=C;
   expressing the discrete-time signal E(z)=A(z)H(z)−B(z) as a polynomial of the order $Z^{-N+1}$ having coefficients $e_i$;
   equating coefficients of the same order on each side of the equation for E(z);
   determining the coefficients of $e_i$ in terms of $a_j$, $b_j$ and $h_j$ from the equated coefficients;
   deriving the coefficients from the receiver training estimates; and
   minimizing the error signal by solving for the coefficients $a_j$ and $b_j$ such that the error signal is minimized.

6. The method of claim 5, wherein the step of minimizing the error signal includes:
   determining partial derivatives of the error signal with respect to $a_j$ and $b_j$;
   setting the partial derivatives to zero and solving for the coefficients $e_i$;
   substituting values of the coefficients of $e_i$ in terms of $a_j$, $b_j$ and $h_j$ and deriving a matrix of equations having the terms $a_j$, $b_j$ and $h_j$;
   multiplying the matrix times a vector having the desired coefficients arranged as $b_0$ through $b_{K-1}$ and $a_0$ through $a_{M-1}$ and setting the product equal to zero;
   equating the first desired coefficient $b_0$ to one;
   determine $h_j$ coefficients from receiver training estimates; and
   solving for the vector of desired coefficients such that the error signal is minimized.

7. The method of claim 1 wherein the time-domain equalizer is applied to a DSL-type device.

8. The method of claim 7, wherein the receiver device is an ADSL Termination Unit—Remote.

9. A non-iterative method of forming a time-domain equalizer for a receiver device using discrete multitone modulation in association with a channel, the method comprising the steps of:
   forming a discrete-time representation of channel response having corresponding coefficients;
   forming a discrete-time representation of time-domain equalizer (TEQ) response having corresponding coefficients, the channel response and TEQ response being arranged to form a combined response;
   choosing a residual output signal of the time-domain equalizer having corresponding coefficients and choosing the signal so that its degree is less than a cyclic prefix C;
   arranging the combined response and the residual output signal with a summation device to form an error signal=(combined response)−(residual response);
   inputting a unit one signal to the channel response and setting the error signal=0, and deriving the relationship of (combined response)=(residual response);
   deriving an expression for the error signal having corresponding coefficients formed in terms of the coefficients corresponding to the combined response and the residual response;
   minimizing the error signal;
   deriving the coefficients corresponding to the channel response from receiver training estimates; and
   solving for the coefficients corresponding to the TEQ.

10. The method of claim 9, wherein the step of choosing a residual output signal includes choosing a signal having a desired frequency response that is flat over the middle of the band.

11. The method of claim 9, wherein the step of deriving an expression for the error signal further includes:
    deriving the coefficients of the error signal in terms of the coefficients of combined response and residual response by equating the terms of like power on either side of the expression.

12. The method of claim 11, wherein the step of minimizing the error signal includes the steps of:
    determining partial derivatives of the energy signal with respect to the coefficients of the TEQ response and the residual response;
    setting the partial derivatives equal to zero;
    substituting values of the coefficients of the energy signal for coefficients in terms of the channel response, the TEQ, and the residual response, thereafter deriving a corresponding matrix of values;
    multiplying the corresponding matrix times a result vector of the desired TEQ coefficients and residual response coefficients;
    setting the product equal to a zero vector; and
    equating the initial coefficient in the result vector to "1."

13. The method of claim 9, wherein the time-domain equalizer is applied to a DSL-type device.

14. The method of claim 13, wherein the receiver device is an ADSL Termination Unit—Remote.

15. A time-domain equalizer (TEQ) apparatus formed in a non-iterative manner in a processor device having associated storage capability, the apparatus comprising:
    a channel having a channel response with corresponding coefficients;
    a TEQ with a response having stored coefficients, the channel response and TEQ response forming a combined response;
    a residual output signal of the time-domain equalizer, the signal having stored coefficients and being chosen so that the degree of the signal is less than a cyclic prefix C;
    a summation device for arranging the combined response and the residual output signal into an error signal= (combined response)−(residual response);
    a unit one-signal input to the channel response, whereby the error signal is set to zero, and the relationship becomes (combined response)=(residual response); and
    a set of stored coefficients of the error signal that are determined in terms of the stored coefficients corresponding to the combined response and the residual response.

16. The apparatus of claim 15, wherein the time-domain equalizer is applied to a DSL-type device.

17. The apparatus of claim 16, wherein the device is an ADSL Termination Unit—Remote.

18. The apparatus of claim 15, wherein DMT modulation is used.

* * * * *